(No Model.)
4 Sheets—Sheet 2.
G. & P. RENNER, & G. H. KNIGHT.
MALT KILN.
No. 283,723. Patented Aug. 21, 1883.
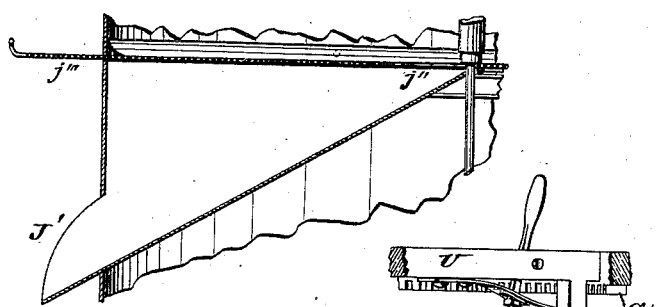
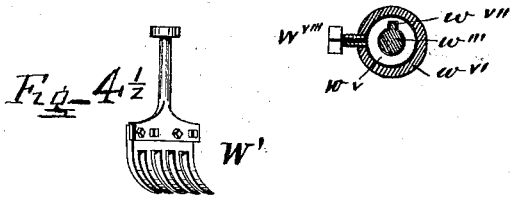
Attest
Carl Spengel
Herbert Knight
Inventors
Georg Renner
Peter Renner
George H. Knight
by Knight Bros Atty's (No Model.)  4 Sheets—Sheet 3.

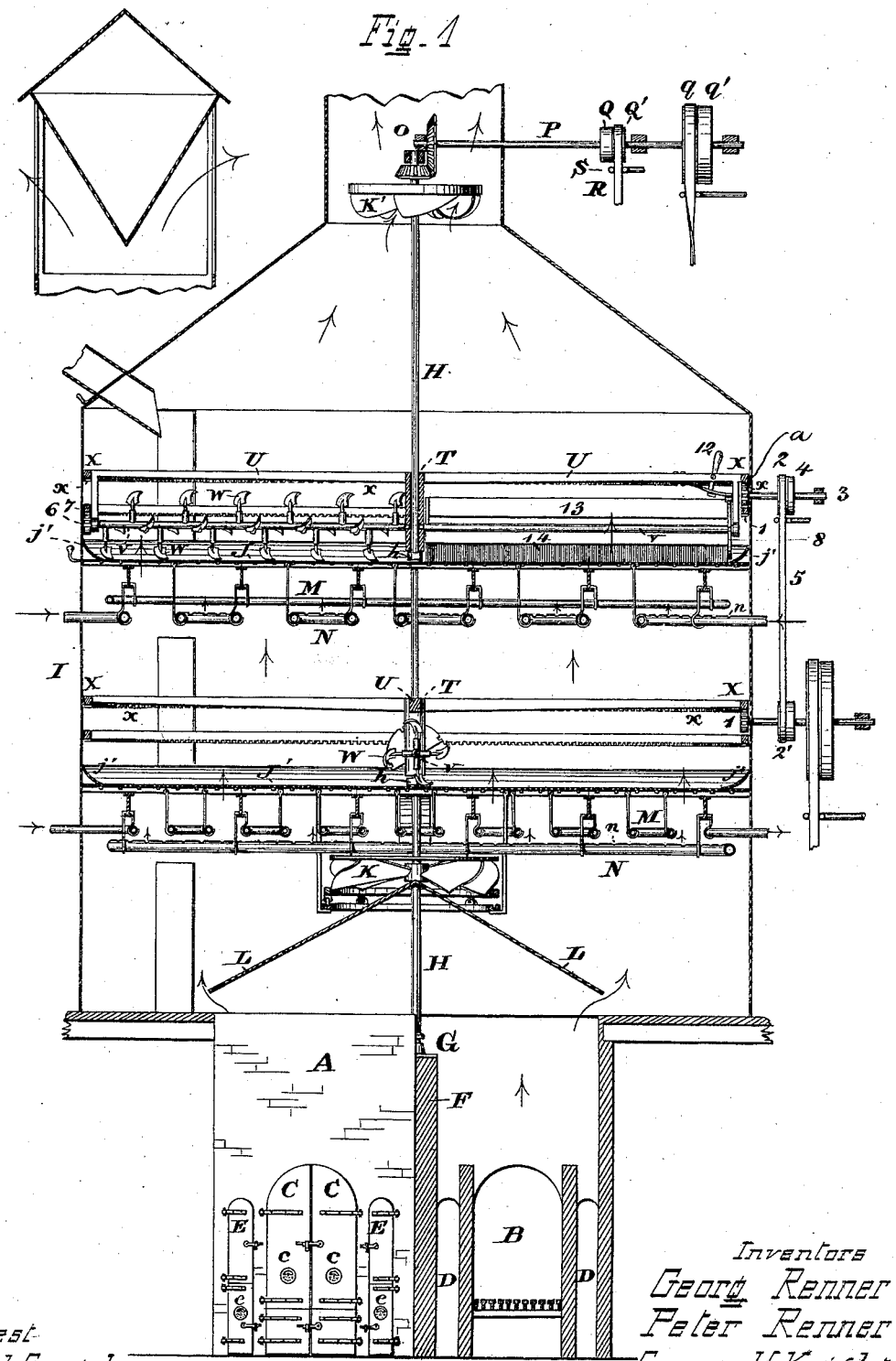

G. & P. RENNER, & G. H. KNIGHT.

MALT KILN.

No. 283,723.  Patented Aug. 21, 1883.

Attest
Carl Spengel
Herbert Knight

Inventors
Georg Renner
Peter Renner
George H. Knight
by Knight Bros Atty's (No Model.) 4 Sheets—Sheet 4.

G. & P. RENNER, & G. H. KNIGHT.
MALT KILN.

No. 283,723. Patented Aug. 21, 1883.

Attest
Carl Spengel
Herbert Knight

Inventors
Georg Renner
Peter Renner
George H. Knight
by Knight Bros Att'ys

UNITED STATES PATENT OFFICE.

GEORG RENNER, PETER RENNER, AND GEORGE H. KNIGHT, OF CINCINNATI, OHIO.

MALT-KILN.

SPECIFICATION forming part of Letters Patent No. 283,723, dated August 21, 1883.

Application filed May 5, 1883. (No model.)

*To all whom it may concern:*

Be it known that we, GEORG RENNER, PETER RENNER, and GEORGE H. KNIGHT, all of Cincinnati, Hamilton county, Ohio, have jointly invented new and useful Improvements in Malt-Kilns, of which the following is a specification.

Our invention relates to means for the more perfect, expeditious, and economical drying of malt.

Figure 7:
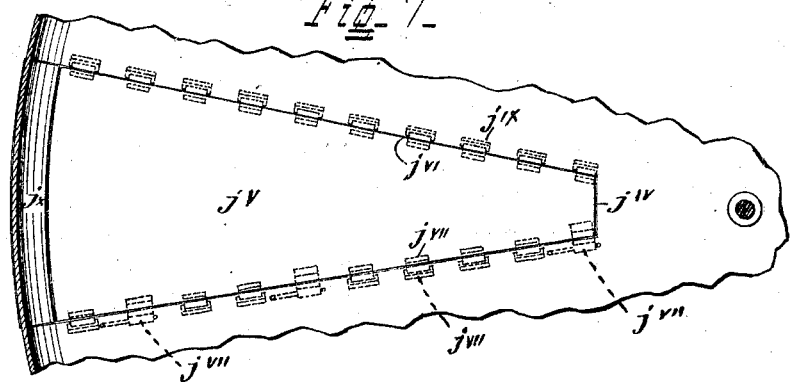
Figure 8:
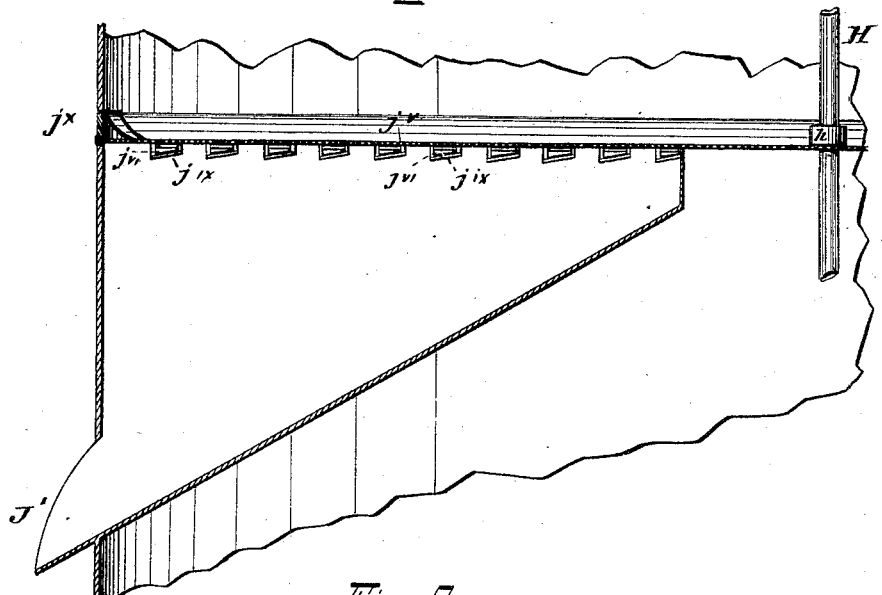
Figure 9:
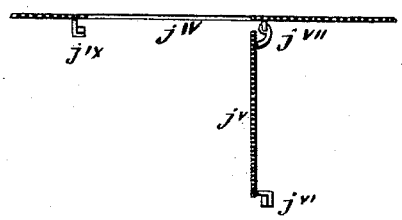
Figure 12:
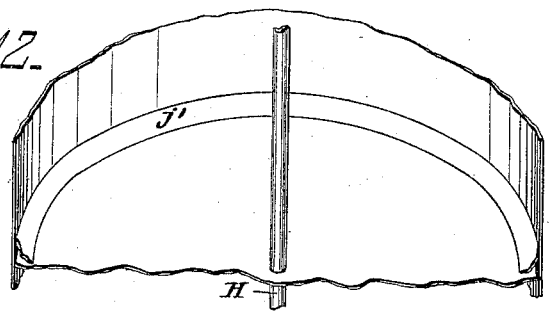
Figure 13:
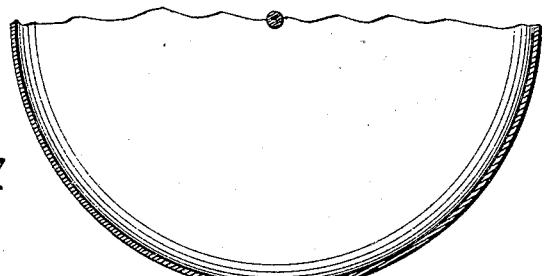
Figure 11:
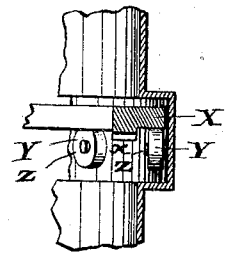
Figure 10:
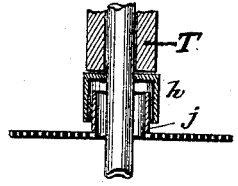
Figure 14:
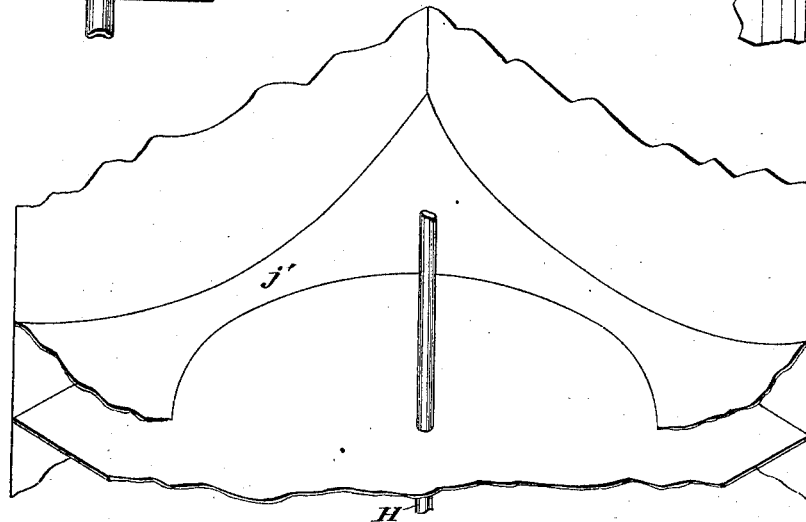

In the accompanying drawings, Figure 1 represents, by vertical section, a double-floor kiln embodying our improvements, a portion of the escape-flue being omitted and its top shown separately. Figs. 2 and 3 are respectively a top view and a vertical section of one form of our discharging device. Fig. 4 is a partly sectioned elevation, showing one of our stirring-shovels. Fig. 4½ shows a stirring-fork, and Fig. 5 a transverse section at line $x$ $x$, Fig. 4; Fig. 6 represents a part of our adjustable sweeper. Figs. 7 and 8 are respectively a top view and a vertical section of the preferred form of our discharging device in its closed condition. Fig. 9 is a transverse section of the same in its open condition. Fig. 10 is a vertical section through the curb. Fig. 11 is a vertical section, showing the bearing for the rim of the brackets. Figs. 12 and 13 show, by vertical section and half plane, the preferred form of our kiln-floor. Fig. 14 shows a modification of such floor for a square room.

A represents a furnace containing any desired number of fire-places, B, closable by door C, which may have registered air-inlets $c$. Flanking said fire-places are air-passages D, closable externally by doors E, which may have registers $e$, which may permit admission of more or less air into said passages. Air in greater quantity may be admitted to said passages by opening one or more of the said doors C or E themselves. At the center of the furnace A is a pier, F, a step, G, on top of which receives the foot of the vertical shaft H, that occupies an axial position in a cylindrical shell, I, which has one or more perforated floors, J J'. A curb, $j$, (see Fig. 10,) which extends upward from each floor immediately around the shaft H, is shut in above and around by flanged collars $h$ upon said shaft. A sloping bank, $j'$, occupies the re-entrant angle between each floor, and the shell I operates to return to the action of the stirring, shoveling, and sweeping devices whatever grain may accumulate at the outskirts of the floors. Each floor has a discharge-opening, which may be parallel-sided and closed by a slide, as at $j''$ $j'''$, Fig. 2, but which is preferably of the sectoral form shown at $j^{iv}$, Figs. 7, 8, and 9, and closed by a flap of corresponding shape, as at $j^{v}$, in said figures. Said flap is hung to the floor by hinges $j^{vii}$, which permit a slight longitudinal shift of the flap clear of the correspondingly oblique hooks $j^{ix}$ that project from the under side of the floor, and thus allow the flap to drop to the perpendicular position shown in Fig. 9, and to deliver into the discharge-chute J' whatever grain is brought over the opening $j^{iv}$. To enable such shift of the flap a space at its outer edge is provided, which, after return of the flap to its place, is closed by a plate, $j^{x}$. The wedge or oblique form of the tongues $j^{vi}$ and hooks $j^{vii}$ cause the flap to come up flush with the floor on being pushed home. (See Fig. 8.)

Secured to shaft H are one or more spiral fans, K K, whose rotation operates both to cause active circulation of air and to force the same air, in a more or less dried and heated condition, up through the floors and through their charge of malt. This upward current tends to lift and separate the malt-grains, and to keep the mass open and uniformly subject to the drying action. A deflector, L, tends to direct the heated air and gases toward the circumference of the inclosure, thus co-operating with the fans in overcoming the tendency which the ascending currents would otherwise have to concentrate on the axial line.

In addition to the above instrumentalities, we may, in some cases, employ immediately underneath each floor a number of pipes—to wit, a pipe, M, which is heated by steam, and a pipe, N, which, having perforations $n$, injects therethrough and against the bottom of the floor currents of air of any desired temperature, forced in by a suitable fan or other customary means. (Not here shown.)

Rotation of shaft H may be effected, by means of geared connection O, with counter-shaft P, whose fast and loose pulleys Q Q' receive the driving-belt R, said belt being controlled by customary belt-shifter S. The shaft H may be provided with another pair of fast and loose pulleys, $q$ $q'$, which may be of considerably larger diameter than the pulleys Q Q', and which are adapted to be driven in opposite direction to the latter and with a much slower motion of the shafting, in order to make possible a slow retrograde rotation of the fans, and consequent downward draft when the floors are occupied by operatives.

Associated with the above-described heating and ventilating devices are expedients for stirring and shoveling and for discharging the malt, which we now proceed to describe.

Resting upon each collar $h$ is a sleeve, T, in which and in brackets U, that project from said sleeve, are pivoted one or more horizontal shafts, V. Some of these shafts are armed with blades W for shoveling the malt, others with blades W' for stirring the malt, and others with a sweeping apparatus.

Attached to outer extremities of the brackets U of each floor is a rim, X, which rests upon wheels Y, (see Fig. 11,) journaled upon studs Z, that project from the shell-wall. An annular rack or crown-wheel, $a$, on the under side of rim X, meshes in a pinion, 1, rotated by a suitable connection with the driving force, preferably a fast pulley, 2, on a shaft, 3, which shaft also carries a loose pulley, 4. A suitable belt, 5, that may be placed on either pulley, enables the starting and stopping the revolution of the brackets U, with their contained stirring and sweeping mechanism.

Some of the shafts V are armed with blades W, some with tines W', and yet others with sweeping apparatus, and are caused to rotate simultaneously with the revolution of their brackets U by the provision on each shaft of a pinion, 6, that meshes in an annular rack, 7, attached to the shell-wall.

The preferable construction of the stirring blades or shovels is shown at Fig. 4. The blade or shovel proper, $w$, is preferably of wood, or of metal shod with wood, and is at its upper edge secured by bolts $w'$ to a head, $w''$, whose helve $w'''$ terminates in a collar, $w^{iv}$, and occupies a sleeve, $w^v$, which sleeve is contained in a tubular arm, $w^{vi}$, that projects from the said shaft V. A tongue, $w^{vii}$, on said helve, occupying a corresponding groove in said sleeve, prevents rotation of the blade independently of the sleeve, but permits longitudinal motion with respect to said sleeve. A set-screw, $w^{viii}$, being tapped through one side of said arm, enables the operator to secure the sleeve $w^v$ at any desired height and angular presentation, the height being preferably such as to cause the lower edge of the blade to sweep in near proximity to the floor without actual contact, and the angular presentation being preferably such as to just compensate for the centrifugal tendency of the stirring mechanism, which tendency is in turn dependent on the speed of sweep of the stirring-arms, the condition of the malt, &c. A spring, $w^{ix}$, while holding the shovel to its most protracted position, as shown, nevertheless permits the shovel to yield to inequalities on the floor, &c. The arms $w^{vi}$ are preferably arranged spirally upon their shafts, as shown in Fig. 1.

For use with woolly or tangled malt, we substitute for the shovels W stirring-forks W'. These forks are particularly designed for use on the upper floor, where two out of the four revolving sweeps may be thus arranged.

Each of one or more of the shafts V has a segment-plate, 8, one of whose three notches, 9 10 11, receives a spring or gravitating latch, 12, which, by occupying the notch 9, holds the sweeping apparatus out of duty. When the latch 12 occupies notch 10, a scraper-blade, 13, is brought into action, which, driving the malt before it, sweeps it into the discharging-aperture $j^v$, exposed by opening the flap $j^{iv}$. When, on the other hand, the latch 12 occupies the notch 11, a broom or rake, 14, is brought into service, that operates to sweep into the discharge-aperture whatever grain has not been removed by the scraper.

We claim as new and of our invention—

1. In a malt-kiln, the combination, with shaft H and circulating-fans K K', of sleeve or bracket U, shaft V, armed with shovels or stirrers W, racks $x$ 7, and pinions 1 6, the whole being constructed and operating substantially as set forth.

2. In a malt-kiln, the stirring-blade whose non-circular helve $w'''$ terminates in a collar, $w^{iv}$, pressed by a spring, $w^{ix}$, and occupies a sleeve, $w^v$, contained in a tubular arm, $w^{vi}$, that projects from the horizontally-revolving and vertically-rotated shaft V, and is held to the desired projection and angle by set-screw $v''$.

3. In a malt-kiln, the combined scraping and sweeping mechanism, in which a scraping-blade, 13, and a broom or rake, 14, occupy remote sides of an adjustable frame whose notched segment-plate 8 is securable in either of three positions by latch 12, substantially as and for the purpose set forth.

4. In a malt-kiln floor, the discharge-opening $j^{iv}$, closable by flap $j^v$, hung to the floor by hinges $j^{vii}$, and supported flush with the floor by oblique tongues $j^{vi}$, which engage on corresponding hooks, $j^{ix}$, substantially as set forth.

5. In a malt-kiln, the combination, with horizontal stirrer, &c., of the malt-kiln floor, having the central curb, $j$, bank $j'$, and sectoral discharge-opening $j^{iv}$, closable by flap $j^v$, substantially as set forth.

In testimony of which invention we hereunto set our hands.

GEORG RENNER.
PETER RENNER.
GEO. H. KNIGHT.

Attest:
L. C. BLACK,
CARL SPENGEL.